UNITED STATES PATENT OFFICE.

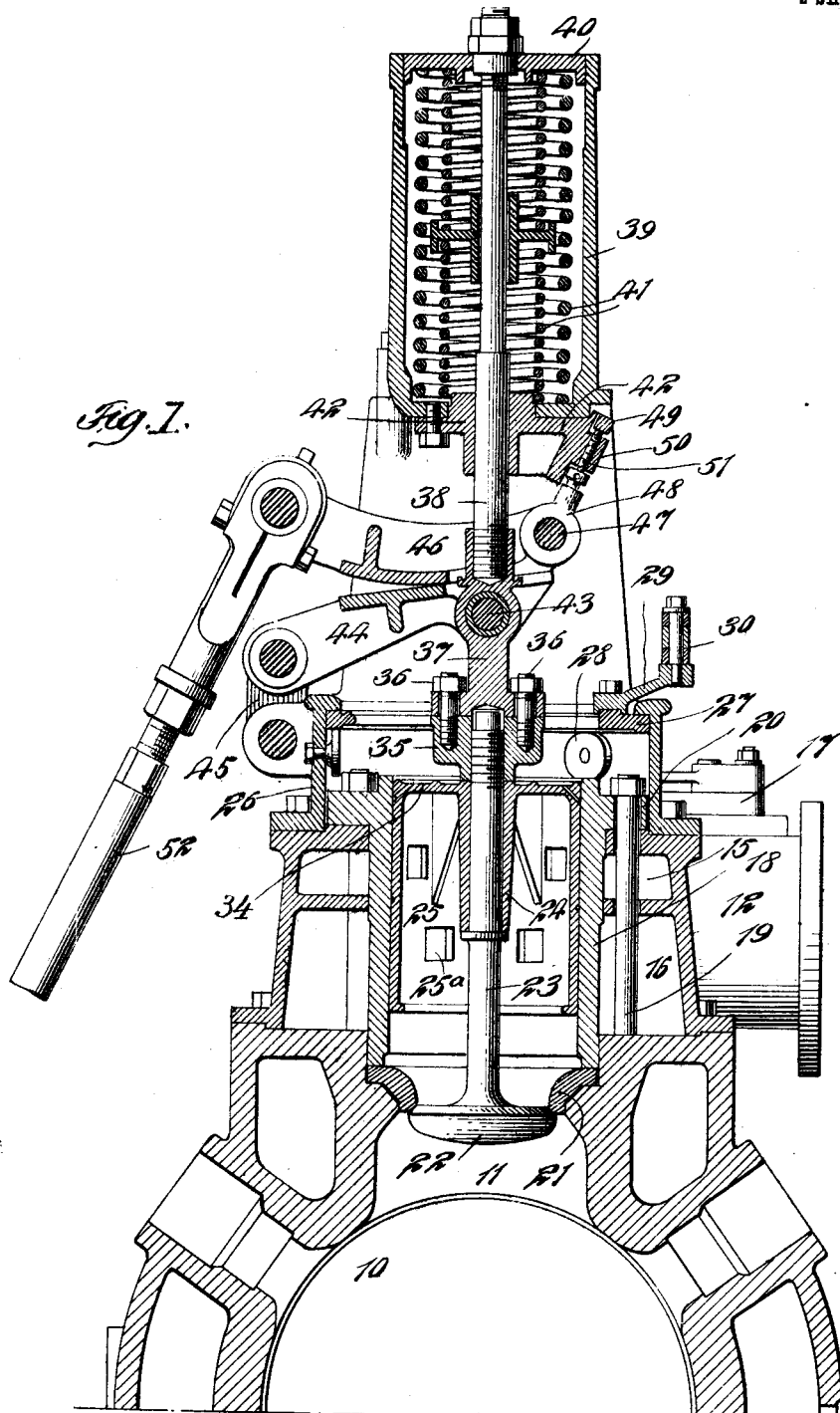

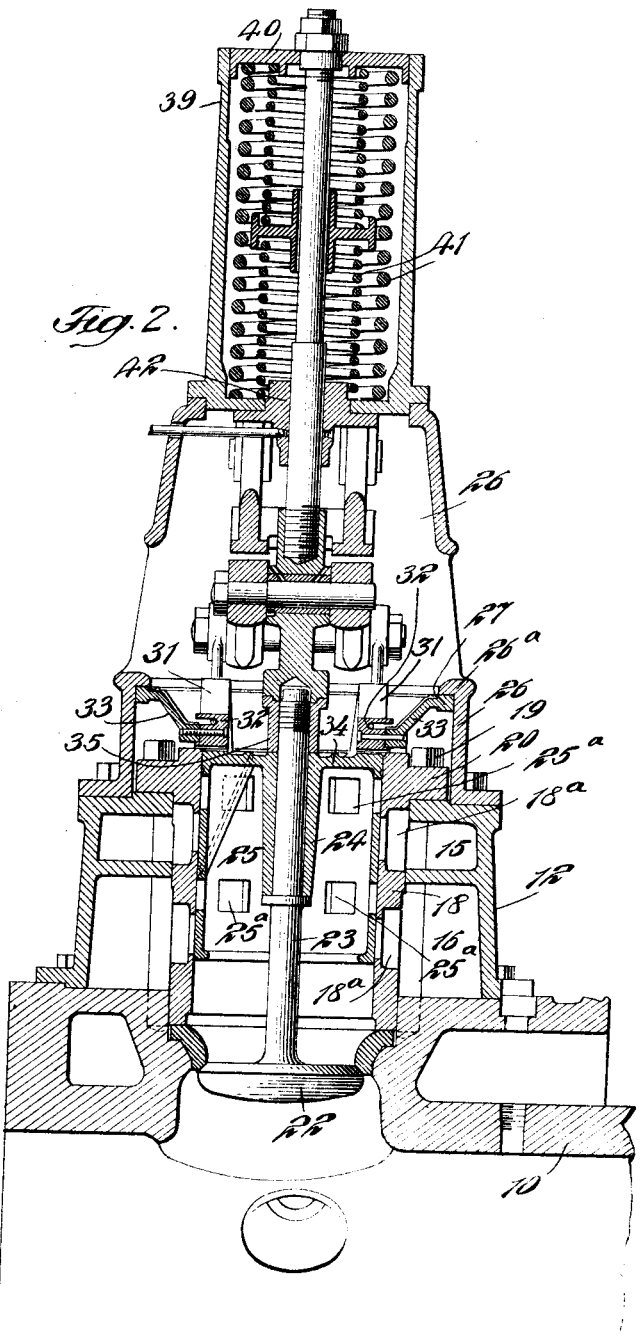

MARTIN A. THIEL, OF MOUNT VERNON, OHIO, ASSIGNOR TO THE C. & G. COOPER CO., OF MOUNT VERNON, OHIO, A CORPORATION OF WEST VIRGINIA.

GAS-ENGINE VALVE MECHANISM.

1,066,062.  Specification of Letters Patent.  Patented July 1, 1913.

Application filed September 22, 1910. Serial No. 583,298.

*To all whom it may concern:*

Be it known that I, MARTIN A. THIEL, of Mount Vernon, Knox county, State of Ohio, have invented certain new and useful Improvements in Gas-Engine Valve Mechanisms, of which the following is a full, clear, and exact specification, such as will enable others skilled in the art to which it appertains to make and use the same.

My invention relates to valve mechanisms for four cycle gas engines of the type in which opposed puppet inlet and exhaust valves are actuated from eccentrics on a lay shaft alongside of the cylinder.

My invention relates to a cylindrical inlet regulating valve which is mounted to rotate on the stem of the inlet valve and to reciprocate with the same. The reciprocation of the regulating valve is uniform and serves to open and close the gas and air ports synchronously with the opening and closing of the inlet valve, while the rotation of the regulating valve is varied under the governor action and serves to regulate the quantity of air and gas admitted in accordance with the load on the engine.

The present improvements in this respect lie especially in the form and construction of the regulating valve, the manner of mounting it in the valve housing or chamber, the means for connecting the regulating valve with the governor linkage and in various other features of structure and combination of parts, all of which will be fully set forth hereinafter and particularly pointed out in the claims.

The invention involves other features of importance, all of which will be fully set forth hereinafter and particularly pointed out in the claims.

For this purpose reference is now had to the accompanying drawings, which represent, as an example, the preferred manner of embodying my invention.

In said drawings: Figure 1 is an enlarged section of the inlet valve taken transversely of the engine; and Fig. 2 is a similar section except that it is taken longitudinally of the engine.

The gear is here shown on a horizontal engine, 10 representing the cylinder. The inlet port 11 is in the upper side of the cylinder. Over and around said port is bolted the inlet valve housing or chamber 12. The housing 12 is provided with chambers 15 and 16 to which the air and gas are respectively supplied. In Fig. 1, 17 indicates the outline of a valve regulating device intended to be set by manual operation according to the known composition of the gas and having nothing to do with the present invention.

18 indicates the regulating valve case which is cylindrical and fitted within the housing 12. This case is secured in place by long bolts 19 which pass through a flange 20 on the upper end of the case and extend through the housing 12 to the cylinder, the case also serving to retain in position the seat 21 of the inlet valve. Said regulating valve case 18 is formed with ports 18ª respectively communicating with the chambers 15 and 16. 22 indicates the inlet valve and 23 its stem, which latter extends centrally through the parts 12 and 18 and rotatably carries the hub 24 of the cylindrical regulating valve 25. This valve fits snugly within the case 18 and has ports 25ª therein, adapted, when the valve 22 is open, to register with the ports 18ª. This valve 25 reciprocates with the stem 23 and valve 22, thus bringing the ports 25ª to the level of the ports 18ª when the valve 22 is open; and said valve 25 turns on the stem for the purpose of increasing or diminishing the extent of lap of said ports 25ª and 18ª, thus increasing or diminishing the quantity of air and gas admitted to the cylinder of the engine.

A tapering coniform bonnet 26 surmounts the housing 12 and encircles, at its base, the flange 20 of the case 18 and the upper end of the regulating valve 25. At a point slightly above those parts the bonnet 26 has an internal annular rib 26ª horizontally disposed and forming a track against the under face of which runs the regulating valve controlling ring 27. This ring is rotatably sustained by rollers 28, which are mounted within the bonnet immediately below the ring and contact with its under surface. Said ring has bolted thereto inside of the track 26ª an arm 29 with which governor connection 30 is made, so that the ring is rotated as the governor is affected. Two pairs of lugs 31 rise from the upper end of the regulating valve 25. The members of these pairs of lugs are provided with parallel opposing vertical faces, and between said members of the pairs of lugs 31 are received studs or blocks 32. These blocks are mounted on inwardly and downwardly extending arms 33 carried by the controlling ring 27, so that as said ring is rotated by the governor, the regulating ring is correspondingly rotated, yet said valve is allowed free longitudinal motion following the inlet valve as explained. The regulating valve, it will be observed, is exposed at its upper end through the various openings in the bonnet 26 and said valve is formed with a head 34 at its outer or top end which forms the inclosing wall of the chamber within the regulating valve. The ring 27 and its connecting parts are also exposed above the valve and readily accessible. This leaves all parts of the mechanism exposed and accessible excepting the inlet valve itself and the interior portion of the regulating valve. The inlet valve, however, is readily removable by removing the parts above, which allows the seat 21 to be taken out and then the valve itself may be lifted through the port.

The upper end of the valve stem 23 projects above the top wall 34 of the regulating valve and is threaded into a nut 35 which bears down on said wall 34 and receives two bolts 36 rigidly fastening it to the inlet valve stem coupling 37. The coupling 37 is threaded and pinned to the valve stem extension 38 forming a rigid connection with the valve stem proper. The inlet valve stem extension 38 projects through the spring case 39 and at its upper end is joined to a spring plate 40 moving freely with the stem in said case 39. The case 39 contains the multiple springs 41 which bear between the spring plate 40 and the bottom plate 42 of the spring case. By means of these springs and the connections above-described the inlet valve 22 is normally seated firmly. The coupling 37 serves the further function of a bearing for the fulcrum pin 43 of the multiplying lever 44. This lever forms part of the gear for operating the inlet valve and it straddles the coupling 37, as shown. Said multiplying lever extends outward from the inlet valve stem and its outer end is sustained by links 45 pivoted to the lever and to the projecting lugs on the bonnet 26. These links are located at the outer side of the bonnet and the bonnet is orificed for the reception of the multiplying lever as shown.

Above the multiplying lever the toe 46 operates. The toe is also of bi-part formation and straddles the inlet valve stem extension, its rounding lower surface bearing on the rounding upper surface of the multiplying lever. The inner end of the toe is pivoted on a pin 47 carried in a bearing 48 which is provided with a yoke 49 encircling a stud 50 on the base plate of the spring case 39.

51 indicates a screw threaded into the lug 50 and engaging the yoke to adjust it and the bearing 48. By this arrangement the position of the pivot pin 47 and therefore of the toe may be adjusted at will. The toe 46 extends substantially horizontally over the multiplying lever to a point outside of the bonnet and is there pivoted to the eccentric rod 52 by which a vertical swinging motion is imparted to the toe and transmitted through it to the valve stem, pulling the stem down against the springs 41 and opening the inlet valve. By adjusting the pin 47 wear may be taken up and knocking of the parts prevented.

The operation of the mechanism will it is thought be understood from the foregoing description. The eccentric brings about regular inward or opening movements of the valve and the valve is, of course, set in time with the cycle of the engine. As the inlet valve opens the regulating valve 25 moves inward correspondingly and the ports 25ª are brought into the plane of the ports 18ª. These ports register to a degree determined by the governor action on the ring 27 rotating the valve 25, according to which as the load increases the valve 25 is turned to increase the degree of register of the ports. This allows an increased supply of air and gas and therefore explosions of increased force. As the load lessens the degree of registry of the ports is decreased with a corresponding decrease in power. This regulation, therefore, is one in which the amount of the charge is varied rather than its quality or composition, resulting in a constant mixture with variable compression. The valve is returned to its seat by the springs 41, subject to the return of the eccentric.

Having thus described my invention what I claim as new and desire to secure by Letters Patent of the United States, is:

1. In a gas engine valve mechanism, the combination of a reciprocating inlet valve and its stem, a regulating valve having an outer end integral therewith which serves to separate the valve chamber from the atmosphere arranged to slide with the inlet valve and stem and mounted on the stem to turn independently thereof, a rotatable member mounted independently of the regulating valve, members carried by said regulating valve having sliding connection with said rotatable member and means for rotating said member.

2. In a gas engine valve mechanism, the combination of a reciprocating inlet valve, a rotating regulating valve reciprocating with the inlet valve having an outer end integral therewith which separates the valve chamber from the atmosphere, a rotatable member having sliding connection with the regulating valve, whereby to transmit rotary motion to the valve independent of its sliding action, and means for rotating said rotatable member, said rotatable member being in the form of an annulus encircling the valve stem.

3. In a gas engine valve mechanism, the combination of a reciprocating inlet valve and its stem, a regulating valve arranged to slide with the inlet valve and stem and mounted on the stem to turn independently thereof, forked members carried by said regulating valve, a rotatable member mounted independently of the regulating valve and having sliding connection with the regulating valve through said forked members and means for rotating said member, said rotatable member being in the form of an annulus encircling the valve stem.

4. In a gas engine valve mechanism, the combination of a reciprocating inlet valve, a rotating regulating valve having an outer integral end exposed to the atmosphere reciprocating with the inlet valve, a rotatable member having sliding connection with the regulating valve, whereby to transmit rotary motion to the valve independent of its sliding action, and means for rotating said rotatable member, said rotatable member having its axis of rotation coincident to that of the regulating valve.

5. In a gas engine valve mechanism, the combination of a reciprocating inlet valve, a rotatable regulating valve sliding with the inlet valve and having two lugs projecting longitudinally therefrom, a rotatable ring independent of the regulating valve, the ring having a projection slidingly engaged between the lugs, and means for rotating the ring.

In testimony whereof I have signed my name to this specification in the presence of two subscribing witnesses.

MARTIN A. THIEL.

Witnesses:
FRED H. THOMAS,
M. B. SMALLEY.

---

Copies of this patent may be obtained for five cents each, by addressing the "Commissioner of Patents. Washington, D. C."